United States Patent [19]
Scourtes et al.

[11] Patent Number: 5,355,713
[45] Date of Patent: Oct. 18, 1994

[54] COLD ENGINE TESTING

[75] Inventors: George Scourtes, Clearwater, Fla.; John P. Gagneur, Westland; Elliott Yush, Ann Arbor, both of Mich.

[73] Assignee: Lucas Hartridge, Inc., Reston, Va.

[21] Appl. No.: 960,232

[22] Filed: Oct. 13, 1992

Related U.S. Application Data

[63] Continuation of Ser. No. 650,918, Feb. 5, 1991, abandoned.

[51] Int. Cl.⁵ .................................................. G01M 15/00
[52] U.S. Cl. .................................... 73/117.2; 73/116
[58] Field of Search .................... 73/115, 116, 118.1, 73/119 R, 117.2; 324/393–400

[56] References Cited

U.S. PATENT DOCUMENTS

| | | | |
|---|---|---|---|
| 2,427,370 | 9/1947 | Schweitzer | 73/116 |
| 2,430,069 | 11/1947 | Mesh | 324/394 |
| 2,450,164 | 9/1948 | Ramsay | 324/394 |
| 3,320,801 | 5/1967 | Rhindress, Jr. | 73/116 |
| 3,538,759 | 11/1970 | Schrom | 73/116 |
| 3,552,196 | 1/1971 | Schrom | 73/117.2 |
| 3,625,054 | 12/1971 | Vesper et al. | 73/115 |
| 3,648,819 | 3/1972 | Converse, III et al. | 198/19 |
| 3,798,964 | 3/1974 | Misseroni | 73/117.2 |
| 3,924,457 | 12/1975 | Oshima et al. | 73/116 |
| 3,988,925 | 11/1976 | Seccombe et al. | 73/119 A |
| 4,015,466 | 4/1977 | Stick et al. | 73/116 |
| 4,050,296 | 9/1977 | Benedict | 73/116 |
| 4,144,746 | 3/1979 | Maringer et al. | 73/117.2 |
| 4,302,814 | 11/1981 | Full et al. | 73/116 |
| 4,557,349 | 12/1985 | Crump | 181/279 |
| 4,562,728 | 1/1986 | Timmerman | 73/116 |
| 4,825,167 | 4/1989 | Bayba | 324/393 |
| 4,941,347 | 7/1990 | Iijima et al. | 73/116 |
| 4,995,365 | 2/1991 | Denz et al. | 324/399 |

Primary Examiner—Robert Raevis
Attorney, Agent, or Firm—Nixon & Vanderhye

[57] ABSTRACT

An internal combustion engine is tested by measuring-/recording the pressure of the exhaust gas as the engine is rotate without combustion.

47 Claims, 12 Drawing Sheets

COLD ENGINE TESTING

This is a continuation of application Ser. No. 07/650,918, filed Feb. 5, 1991, now abandoned.

FIELD OF THE INVENTION

This invention relates to engine testing; more particularly, it relates to production line testing of internal combustion engines without actual operation of the engines being tested.

BACKGROUND OF THE INVENTION

In the manufacture of internal combustion engines, it is common practice to conduct engine testing at the end of the production line to identify and correct engine defects. Most commonly used is the so-called hot engine testing in which the engine is subjected to dynamic testing in which the engine is operated with or without load. It is also known to conduct cold engine testing on the production line wherein the crankshaft of the engine is rotated by an auxiliary motor instead of operating the engine under its own power.

There are certain advantages to cold engine testing but heretofore, such testing has not been useful in identifying certain types of engine defects.

A general object of this invention is to provide an improved method and system for cold engine testing which overcomes certain disadvantages of the prior art.

SUMMARY OF THE INVENTION

This invention provides a method and apparatus for testing of engine on the factory production line with the engine being driven by an external motor connected with the engine crankshaft. The engine is not fired up to operate under its own power. In this condition of "cold motoring" data is obtained and analyzed to identify and locate engine faults. Information is obtained which has not previously been available in production line testing.

In accordance with this invention, the ignition circuit is energized with the supply voltage less than normal so that the spark plug will not fire when the gas compression in the cylinder is normal. If firing does result, certain faults are indicated in the spark plug or in engine compression.

Further, in accordance with this invention, the pressure waveform in the intake manifold is analyzed at an engine speed sufficiently low that the peaks and valleys of the waveform can be compared with a reference waveform for a normal engine. This analysis permits certain findings regarding potential faults in the cylinder valves.

Also, in accordance with this invention, the pressure waveforms in the exhaust manifold are analyzed at controlled speed of rotation. This permits identification of certain potential faults in the cylinder valves.

Further, in accordance with this invention, the ignition circuit analysis is coupled with either an intake vacuum pulse analysis or with an exhaust pulse analysis to obtain the broad range of detailed information indicative of certain engine faults.

A complete understanding of this invention may be obtained from the detailed description that follows taken with the accompanying drawings.

BEST MODE FOR CARRYING OUT THE INVENTION

Figure 1:
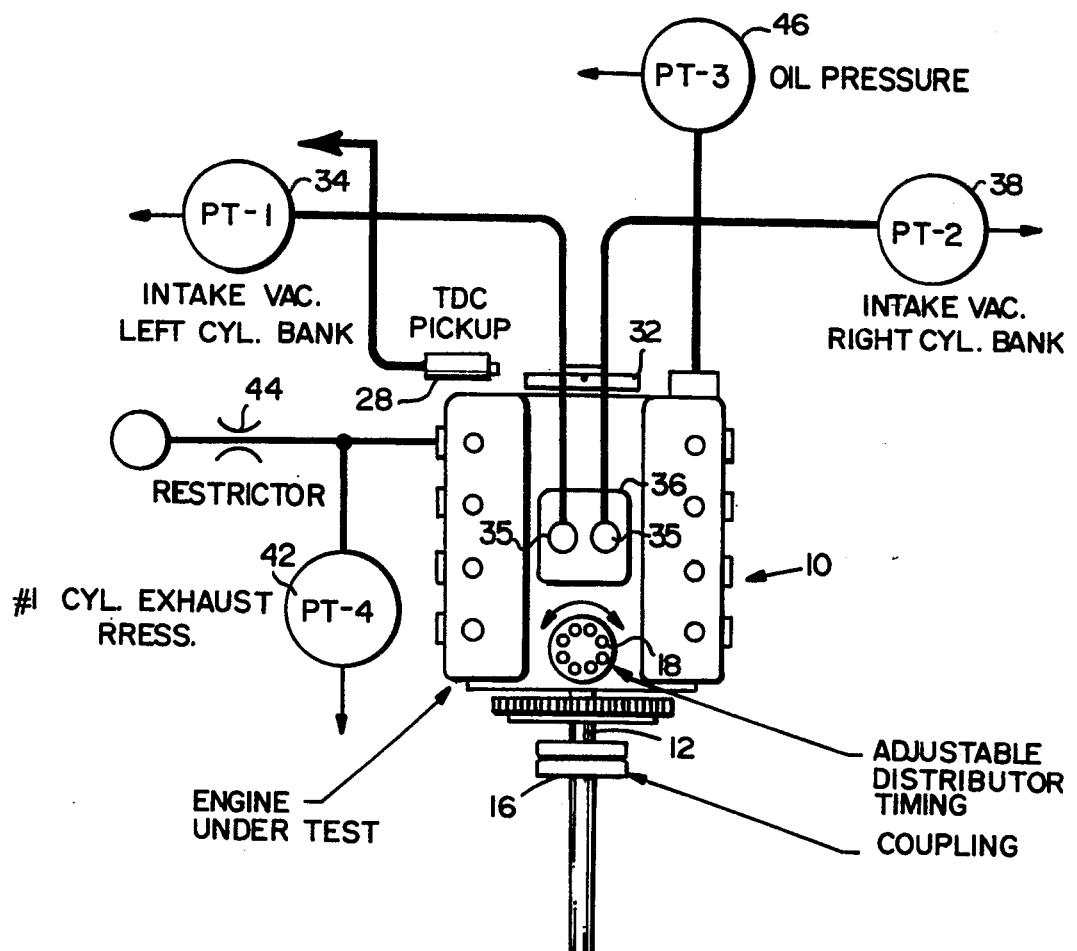
FIG. 1 is a diagram of a test stand for a cold test system with intake pulse analysis.
Figure 1:
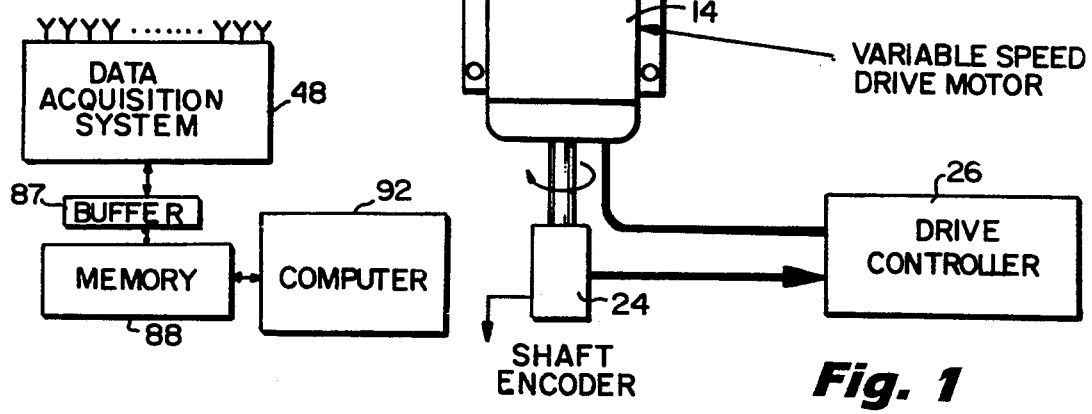

Referring now to the drawings, there is shown an illustrative embodiment of the invention in a method and system for conducting cold engine testing. It will be appreciated, as the description proceeds, that the invention is useful with various types of internal combustion engines and may be implemented in many different embodiments.

In accordance with this invention, cold engine testing is conducted under dynamic conditions in which the engine crankshaft is rotated at controlled speed by an external motor. The engine is not operated in its running mode during the cold engine testing. For this purpose, the engine is mounted on a test stand which includes certain sensors and controls which will be described.

FIG. 1 shows a test stand adapted for cold engine testing using intake pulse analysis. The engine 10 under test may be a complete engine and capable of running under its own power except that it is not supplied with a fuel induction system. In the illustrative embodiment, the engine 10 is a V8 engine. The engine crankshaft 12 is coupled to a variable speed drive motor 14 through a drive coupling 16. A shaft encoder 24 is coupled to the shaft of the drive motor 14 and produces an output signal corresponding to the angular displacement of the crankshaft. The shaft encoder output is coupled to a drive controller 26 which controls the speed of the drive motor 14 at a preset value. The encoder output is also coupled to an input of a data acquisition system 48 which will be described subsequently.

The test stand, as shown in FIG. 1, is provided with various sensors which are coupled with the engine 10. Such sensors include a top dead center (TDC) pick-up 28 which is suitably coupled with a crankshaft driven pulley or wheel 32 to provide an output pulse each time the engine crankshaft reaches the top dead center (TDC) position. The sensors also include an intake vacuum transducer 34 which is connected through a vacuum line to the left cylinder bank of the engine by an intake probe connector 35 with the intake passage of the throttle body 36. Similarly, an intake vacuum transducer 38 is coupled to the right cylinder bank of the engine. The probe connector 35 is automatically actuated between an advanced position in which it is sealed to the intake manifold (simulating closed throttle) and a retracted position in which is not sealed (simulating open throttle). A pressure transducer 42 is connected through the pressure line to the #1 cylinder exhaust port which is vented to the atmosphere through a flow restrictor 44. An oil pressure transducer 46 is coupled to an oil pressure port in the engine. The vacuum transducers 34 and 38 and the pressure transducers 42 and 46 are suitably conventional transducers which develop an analog output signal which is coupled to respective input channels of the data acquisition system 48. The TDC pick-up 28 and the shaft encoder 24 are suitably conventional sensors and adapted to produce digital output signals; the output signals from these sensors are coupled to respective input channels of the data acquisition system 48. The connections between the sensors and the data acquisition system are not shown in the drawings.

Figure 2:
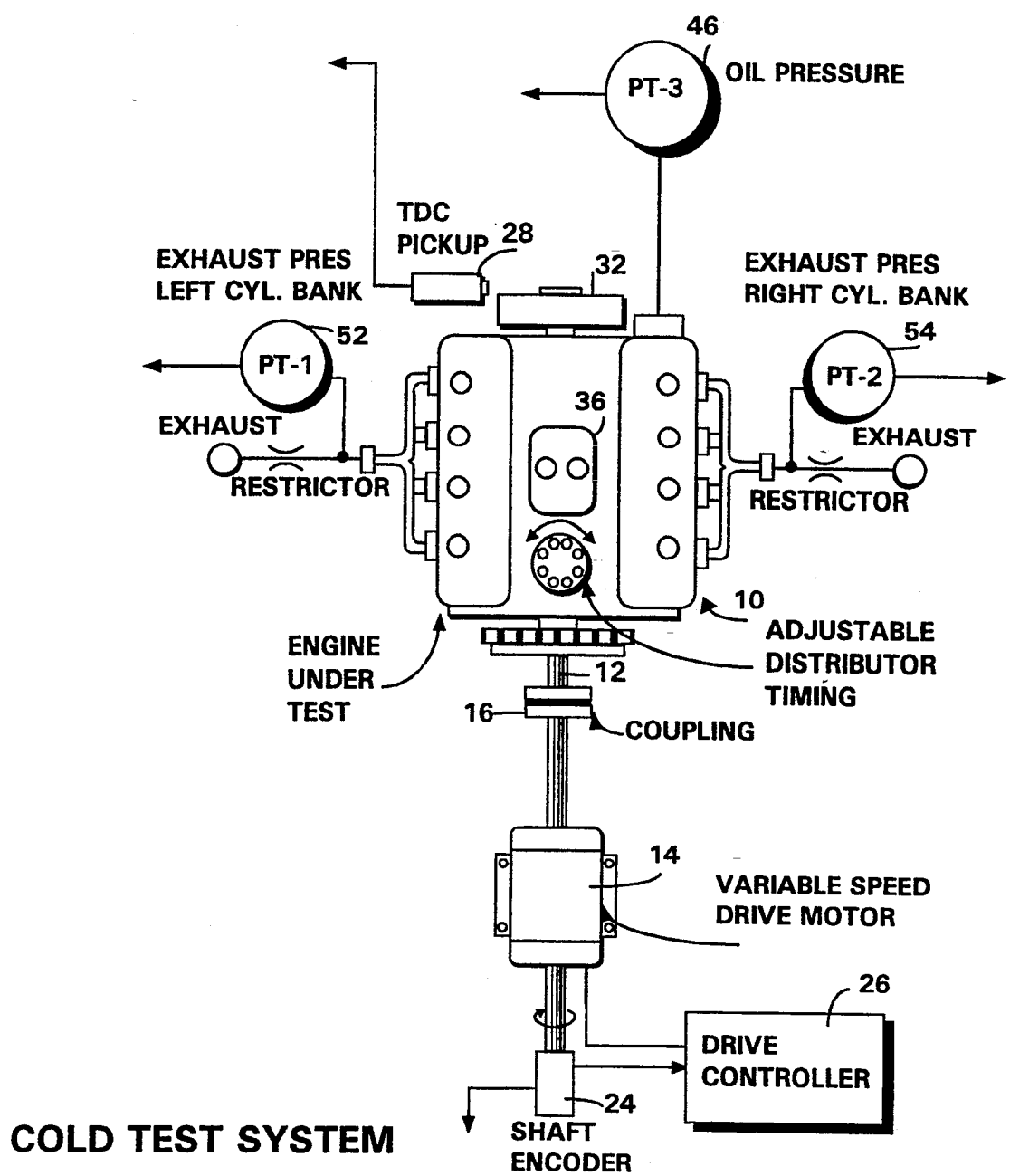
FIG. 2 is a diagram of a test stand for a cold test system with exhaust pulse analysis.
Figure 2:
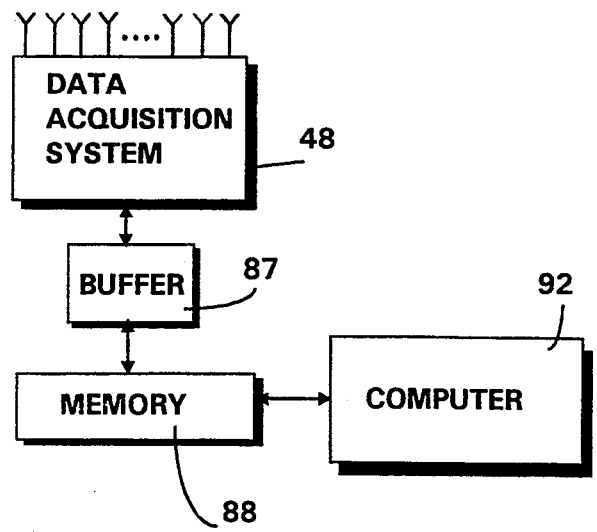

As shown in FIG. 2, the test stand may optionally be provided with sensors for use in exhaust pulse analysis. For this purpose, a pressure transducer 52 is coupled to the left exhaust manifold for developing a signal corresponding to the exhaust pressure in the left cylinder bank. Similarly, a pressure transducer 54 is coupled with the right exhaust manifold for developing a signal corresponding to the exhaust pressure in the right cylinder bank. The pressure transducers 52 and 54 are coupled to respective input channels of the data acquisition system 46.

Figure 3:
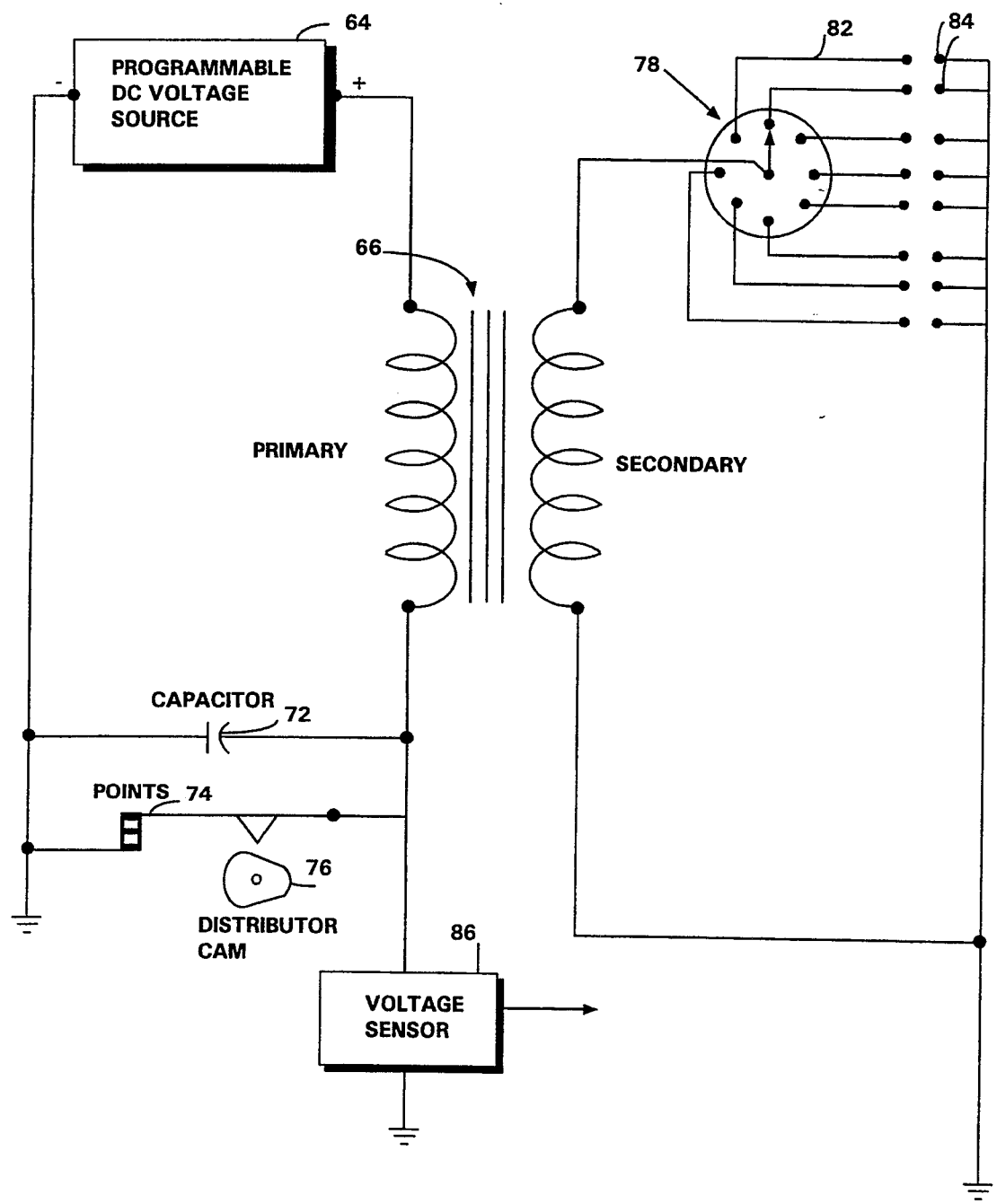
FIG. 3 is a schematic of ignition circuit for the test engine.

The ignition system of the engine 10 is represented schematically in FIG. 3. The ignition system is illustrated as a breaker-point distributor system but, as will be well understood, it could take other forms such as a conventional solid state ignition system. The ignition system for the engine in its normal operation comprises a battery such as the standard twelve volt vehicle battery. For cold testing, the ignition system is provided with a programmable DC voltage source 64 which will provide selectively a voltage ranging from zero to sixteen volts. The ignition coil 66 has one terminal of a primary winding connected to the positive terminal of the voltage source 64. The other terminal of the primary winding is connected through the ignition capacitor 72 to the negative terminal of the voltage source which is connected to ground. The breaker-points 74, operated by the distributor cam 76, are connected in parallel with the capacitor 72. The secondary winding of the ignition coil 66 has one terminal connected to ground and the other terminal connected to the rotor of the distributor 78. The respective contacts of the distributor, one for each of the eight engine cylinders, are connected through the respective spark plug high voltage leads leading to the respective spark plugs 84 through the spark gap of the plug to ground. A voltage sensor 86 is connected across the breaker-points in the primary ignition circuit and provides an output voltage corresponding to the instantaneous value of voltage across the points. This output voltage is applied to a respective input channel of the data acquisition system 48.

The data acquisition system 48 is a conventional multiplexed analog-to-digital converter. It has multiple input channels, one of which is used for each different sensor and it is provided with signal processing circuitry in each input channel to provide the A to D converter with suitable input signals. The output of the data acquisition system 48 is coupled to a buffer 87 which is coupled to a data storage device, suitably a hard disk memory 88 for storage of each channel of input data. A computer 92 is coupled with the memory 88 and is adapted to process the data in a manner to be described. A display screen and a printer are also provided in a conventional manner.

Figure 4:
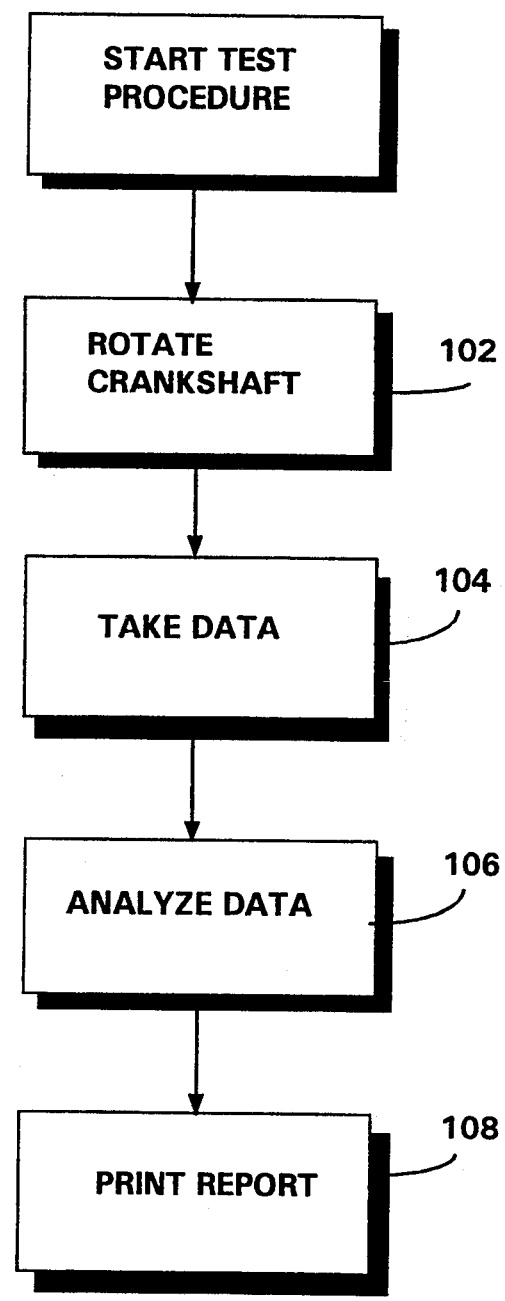
FIG. 4 is a test procedure flow chart.

The general test procedure is illustrated in the chart of FIG. 4. With the engine 10 under test installed on the test stand with the sensors connected, the test stand is ready for the test procedure. The operator at the test stand uses the computer and other controls to initiate the test. The engine is rotated by the drive motor 14 at controlled speed as indicated in block 102. This is referred to herein as "cold motoring" of the engine. Under control of the computer 92 the system records data during cold motoring as indicated by block 104. Then, the data is analyzed as indicated by block 106 and the results of the analysis are printed out by the computer as indicated by block 108.

In a cold test procedure to be described herein, the testing utilizes ignition circuit data and analysis for identifying certain engine faults. For certain types of engines and for identifying certain faults, the cold test procedure utilizes intake manifold pulse analysis. For example, this type of testing is especially suited for engines having throttle body fuel injection (the testing is performed without the throttle body installed so that access is gained to the intake manifold). In other types of engines which is a multi-port fuel injection engine with an intake plenum, exhaust pulse data analysis is preferred because the large volume plenum does not lend itself to pulse sensing. Both intake analysis and exhaust pulse analysis systems will be described below.

Ignition Circuit Operation During Cold Motoring

Figure 5:
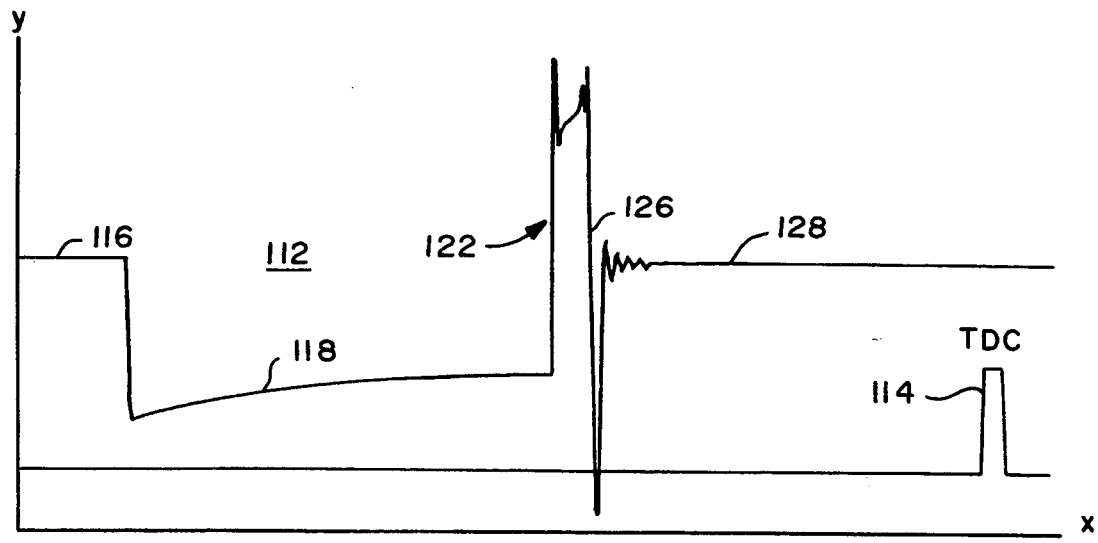
FIG. 5 is an ignition circuit waveform for a spark plug firing.
Figure 6:
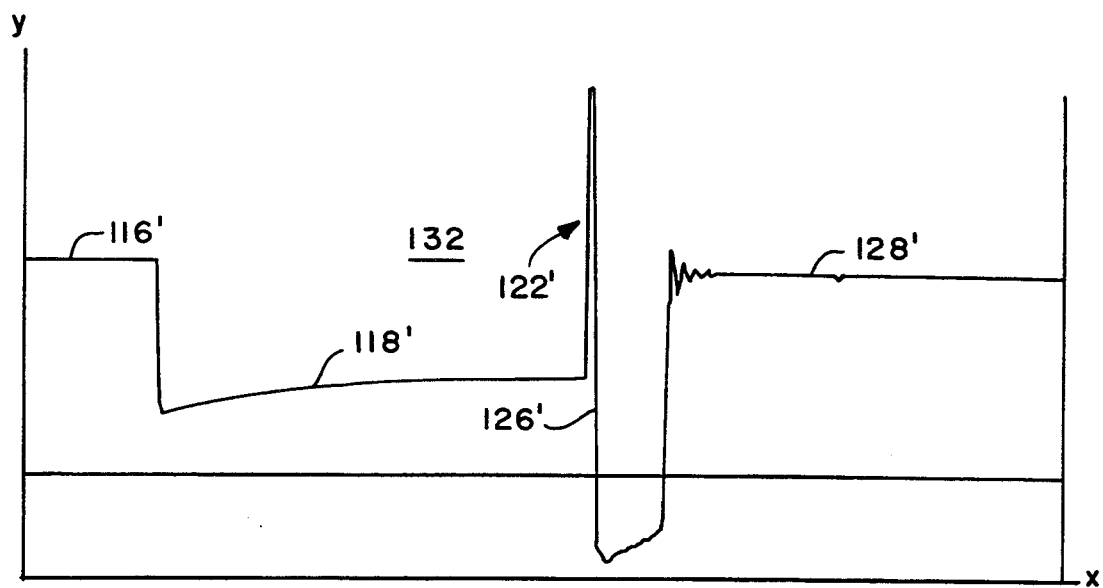
FIG. 6 is an ignition circuit waveform for a non-firing spark plug.

The data which is recorded on the ignition system during cold motoring is represented in FIGS. 5 and 6. FIG. 5 shows the voltage which is developed across the breaker-points 74 as measured by the voltage sensor 86. This voltage waveform which is measured in the ignition primary circuit is representative of ignition circuit operation with normal firing of the spark plug, i.e. arcing between the spark plug electrodes, in response to the high voltage induced in the ignition secondary circuit upon opening of the breaker-points. FIG. 5 shows the primary circuit voltage waveform 112 as a function of crank shaft rotation relative to the TDC position. On this waveform diagram, the Y axis represents voltage amplitude and the X axis represents crank angle. The TDC position of the crankshaft is shown by the TDC pulse 114. The voltage waveform 112 includes an initial portion 116 which is at battery voltage level and occurs with the breaker-points 74 open. When the breaker-points close, the voltage decreases abruptly, because of current flow through the primary winding, to a relatively low value represented by waveform portion 118 which represents the "dwell" voltage which exists while the breaker-points 74 are closed. When the breaker-points open, the voltage waveform rises abruptly in a high voltage pulse 122 until arcing occurs across the spark plug electrodes. This arcing is indicated by the transient peaks and valleys and a high voltage is sustained for a significant time interval by the ignition circuit before the high voltage pulse abruptly decreases and forms a negative going spike 126. The voltage then levels off, after some oscillation, to the battery voltage level represented by waveform portion 128 which is sustained while the breaker-points are open.

The data represented by the waveform 112 is recorded by the data acquisition system 48 and the memory 88. For this purpose, the waveform 112 as detected by the voltage sensor 86, is sampled at a high rate by the data acquisition system 48, suitably at the rate of three thousand points per complete engine cycle. An engine cycle is constituted by seven hundred twenty degrees of crankshaft rotation. The shaft encoder 24 supplies crankshaft position information to the data acquisition system 48, relative to the TDC position, such that three thousand 10 position pulses or data points are generated for each engine cycle. The value of the waveform at each of the three thousand data points is initially recorded in the buffer memory 87 for one or more complete engine cycles. During each engine cycle, there will be eight ignition events, one for each spark plug, such as the one represented by the waveform of FIG. 5. After the taking of data for the ignition circuit, the data is transferred from the buffer 87 to permanent storage in memory 88.

Before proceeding with a description of data analysis, reference is made to the ignition circuit waveform shown in FIG. 6. This voltage waveform 132 represents the voltage measured by the sensor 86 in the case of an ignition event which did not cause firing of the spark plug. The waveform 132 is substantially the same as waveform 112 except for the high voltage pulse which occurs when the breakerpoints open and the aftermath of that pulse. In the waveform 132, the high voltage pulse 122' is a very narrow spike which rises to a high value; since no arc is produced between the spark plug electrodes, the voltage decreases abruptly from its peak value and energy is dissipated within the circuit components instead of in an arc discharge. Consequently, there is a wide negative going pulse 126' which is of long duration relative to the positive going pulse 122'. The negative going pulse 126' terminates with some oscillation at the battery voltage level similar to that described with reference to the waveform 112.

It is observed, with reference to FIGS. 5 and 6, that it can be determined whether or not a spark plug fires by examination of the voltage waveform across the breaker-points in the ignition primary. In the case of a spark plug which fires, the high voltage pulse 122 is significantly wider with a greater area than a spark plug which does not fire.

For the purpose of data analysis of the ignition circuit waveform, it is only necessary to consider the ignition event, i.e. the voltage waveform occurring from a time before opening of the breaker-point to a time after the occurrence of the high voltage pulse. For each ignition event, i.e. for each of the eight spark plugs, the desired analysis can be made based upon about eighty data points representing the event. The interval between the events, during which the primary circuit voltage is at battery voltage with the breaker-points open, can be ignored. Thus, the desired data for an engine cycle is represented by a total of six hundred forty data points with eighty points per ignition event.

The data analysis can be done manually; however, it is preferably performed by computer using a conventional spreadsheet program, for example, the well-known Lotus or Excel spreadsheet program. For this purpose, the ignition circuit data is entered from the memory 88 in a single column with six hundred forty data points or "cells" for each engine cycle. Each set of eighty points for an ignition event is analyzed by computing the area under the high voltage pulse. This is suitably done by adding all of the positive value data points which occur after the dwell voltage and comparing the value of the summation with a reference value which represents a normal ignition event of a spark plug which is fired. If the test value differs from the reference value by a predetermined amount, say ten percent, it is determined that the plug did not fire. This data analysis, which determines whether a spark plug fired or not during testing, is used in the testing procedure in a manner to be described subsequently.

Intake Vacuum During Cold Motoring

Figure 7:
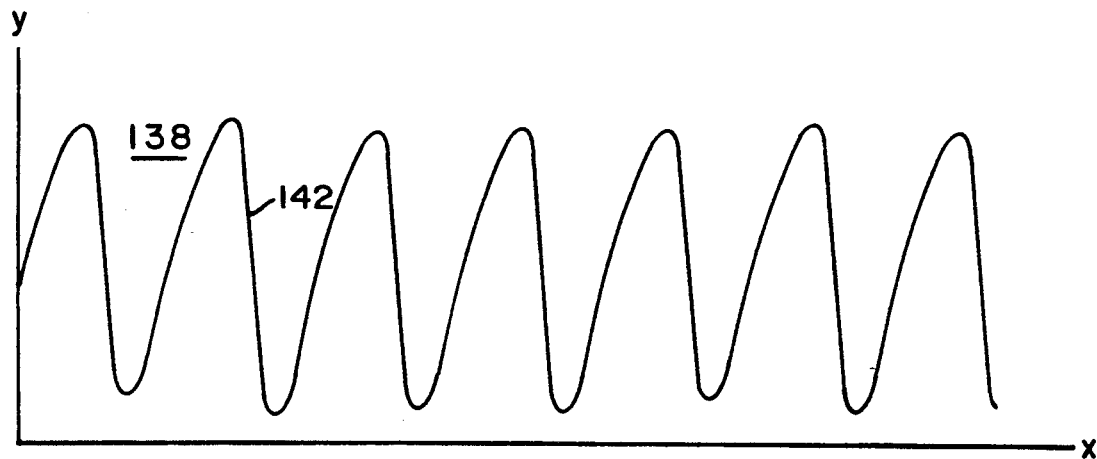
FIG. 7 is a waveform of the intake manifold vacuum for a normal engine.

During cold motoring of a test engine, the vacuum pulses developed at the intake manifold take the form of unique signatures. A properly assembled "good engine", will develop one type of signature while defective engines will exhibit uniquely different signatures. These differences can be used to identify various defects, as will be discussed below. As previously mentioned, the vacuum intake pulses are recorded and the data is analyzed in the test procedure. Vacuum pulses are generated in the intake manifold by the cyclical action of the intake valves and the intake stroke of the piston. FIG. 7 is a waveform diagram of vacuum pulses in an engine having properly operating intake valves, i.e. they are not defective. With reference to the test engine 10 as indicated in FIG. 1, the waveform 138 represents the vacuum pulses in the left cylinder bank as measured by the vacuum transducer 34. During the cold motoring operation, the intake valve of each cylinder starts to open while the respective piston approaches top dead center. At this point, some of the vacuum already in the manifold as developed by the other cylinders escapes through the open valve into the cylinder. This vacuum loss produces a valley between the waveform pulses. As the stroke continues, the piston in that cylinder moves down the bore and creates an even higher vacuum in the manifold which is represented by the waveform crest or peak. The succeeding cycles of vacuum loss and vacuum increase result in the successive valleys and peaks in the intake manifold as represented by the waveform 138. At relatively low engine speeds, the waveform peaks and valleys are quite pronounced as illustrated; at higher engine speeds the pulse levels diminish because there is insufficient time for the vacuum flow in and out of the manifold and at even higher speed, the vacuum develops a steady state value.

During cold motoring of the engine, the cycling of the pistons and valves is controlled by the crankshaft and the camshaft which are mechanically linked together and are rotated in timed relation. The valves are actuated by the camshaft and a linkage mechanism which may include a push rod, lifter and rocker arm. Lost motion in the linkage affects the timed relationship of the piston and valve actuation and is referred to as valve lash. Valve lash will affect the air intake pulses because it results in an imbalance in the air flow velocity in and out of the cylinder. Examples of valve train faults which may be detected by cold engine testing according to this invention include the following: soft or collapsed lifters, lifters stuck open, bent pushrods, wrong camshaft, loose rocker armpivot bolts and unmachined seats or valve faces.

The vacuum pulse waveform 138 shown in FIG. 7 represents the intake vacuum for the left cylinder bank of engine 10 as detected by the vacuum transducer 34. This waveform 138 is representative of a normal set of intake valves for the engine 10. The waveform is shown as a function as crankshaft rotation relative to the TDC position. On the diagram, the Y axis represents the vacuum amplitude and the X axis represents crank angle. It is noted that each of the pulses have a given wave shape and amplitude typical of the engine under test operating at a given speed, namely three hundred RPM, and the pulses for all four of the valves are the same. (Each pulse is identified with a certain one of the left bank intake valves by its position relative to top dead center and the firing order for the engine.)

Figure 8:
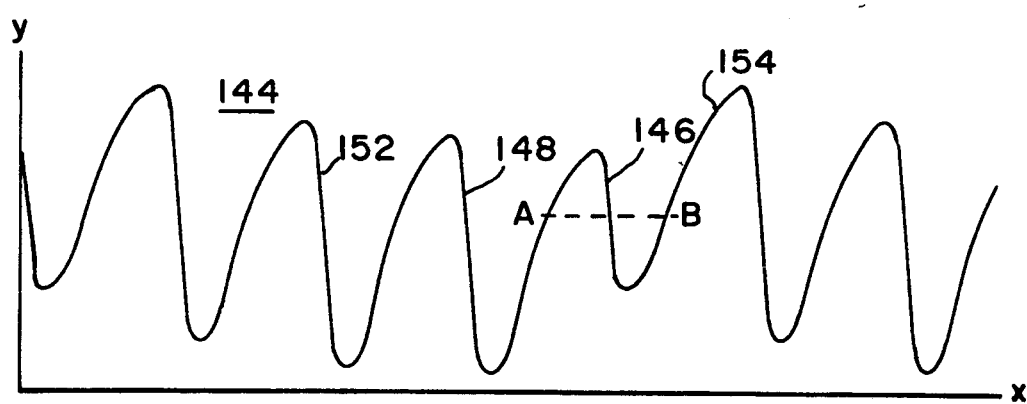
FIGS. 8 & 9 are waveforms of intake manifold vacuum pulses for an engine having defective intake valves.
Figure 9:
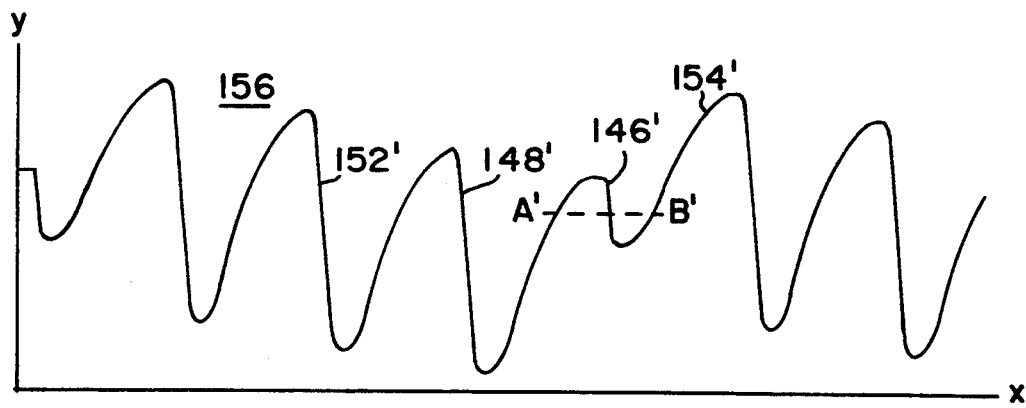

FIG. 8 depicts a vacuum pulse waveform 144 for the engine 10 as sensed by the transducer 34 under the conditions of a given value of valve lash, for example a lash of 0.020 inches, in one valve. Because the one valve is open for a shorter time interval, the vacuum pulse 146 ranging from point A to point B corresponding to that valve and its cylinder, is of reduced pulse amplitude compared to a normal vacuum pulse as represented by the pulses in FIG. 7. It is noted also that the adjacent pulses 148 and 152 are shifted with respect to absolute vacuum but are not affected in relative amplitude. FIG. 9 depicts a waveform 156 for the same situation as that of FIG. 8 except that the same defective valve has a greater amount of lash, for example 0.040 inches. The effect on vacuum pulse 146' is even a greater reduction in the peak value than that of corresponding pulse 146. The effect of the valve lash on other pulses 148', 152' and 154' is more pronounced than that depicted in FIG. 8.

Referring again to FIGS. 7, 8 and 9, it is observed that it can be determined whether or not there is a defective intake valve by examination of the vacuum waveform in the intake manifold. In the case of the defective valve such as valve lash, one or more of the vacuum pulses is of significantly lower peak value than the normal vacuum pulse under corresponding operating conditions.

As discussed, FIG. 8 shows the vacuum waveform which is developed in the intake manifold for the left cylinder bank of engine 10 under cold motoring at 500 RPM. The data represented by the waveform 144 is recorded by the data acquisition system 48 and the memory 88 in the same manner as the voltage waveform 112 was recorded as described above. The value of the vacuum is sampled at the rate of 3,000 points per complete engine cycle and thus a vacuum pulse is recorded for each of the four cylinders in the left cylinder bank. A corresponding record of data is made for intake vacuum in the right cylinder bank as measured by the vacuum transducer 38.

For the purpose of data analysis of the intake vacuum waveform, for example waveform 144, the area under each of the pulse waveforms for the four respective cylinders is compared with the area under the normal waveform for the engine. Additionally it may be desired in some cases to compare the peak value and/or width of each test pulse with established values of a normal pulse. This comparison can be done manually by examination of a printout of the waveform or examination of a computer display. Preferably the comparison is performed by use of the computer as described with reference to analysis of the ignition circuit waveform.

Exhaust Pulses During Cold Motoring

During cold motoring of the test engine, the pressure pulses developed in the exhaust manifolds of the engine also can be used for detecting defects or faults. The exhaust pulses in the cold motoring engine, even though they are pressure pulses, exhibit many of the same characteristics as the intake manifold vacuum pulses. A faulty exhaust valve, for example with valve lash, and also a faulty intake valve with valve lash will have an affect on the wave shape of the exhaust pressure pulses in the exhaust manifold. This is illustrated in FIGS. 10 through 13 which represent exhaust manifold pressure waveforms for the test engine 10.

Figure 10:
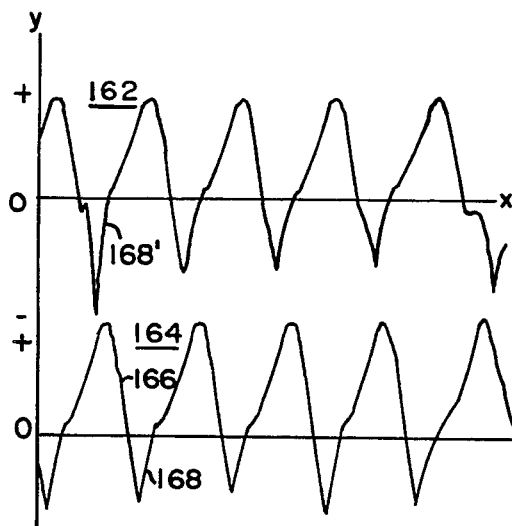
FIG. 10 shows waveforms of pressure pulses in the exhaust manifolds for a normal engine and for an engine having a defective exhaust valve.

FIG. 10 shows the pressure waveforms for the exhaust manifolds of the engine 10 under conditions which will be described. Waveform 164 represents the pressure variations in the right bank manifold as measured by pressure transducer 54 and waveform 162 represents the pressure variations in the left bank manifold as measured by pressure transducer 52. The waveforms are shown as a function crankshaft rotation relative to the TDC position with pressure amplitude shown on the Y axis and crank angle shown on the X axis. The data represented by the waveforms is sampled in the same manner as described with reference to the vacuum waveforms. The pressure waveforms 164 and 162 include negative pressure or vacuum excursions extending below the zero pressure level and positive pressure excursions above that level. The waveform 164 comprises pressure pulses 166 and vacuum pulses 168 which are produced by the engine during cold motoring with nondefective exhaust and intake valves for the right bank cylinders. Thus, the pressure pulses 166 are normal exhaust manifold pressure pulses and the vacuum pulses 168 are normal exhaust manifold vacuum pulses and will be used as reference values for test purposes.

The waveform 162 represents the exhaust pressure pulses in the left bank manifold in the case of an exhaust valve with 0.020 inches of lash. This valve defect causes the vacuum pulse 168' to have a larger amplitude or peak value whereas the other vacuum pulses and the pressure pulses are substantially unaffected. Thus, the condition of valve lash in an exhaust valve can be detected by comparison of the recorded amplitude of the test vacuum pulse with that of the normal vacuum pulse. When the test pulse amplitude exceeds that of the normal pulse by a predetermined amount, it is taken as an indication of an exhaust valve with excessive lash.

Figure 11:
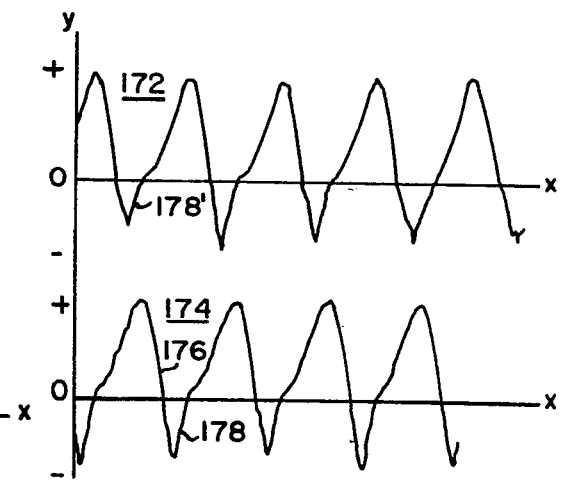
FIG. 11 shows the pressure waveforms in the exhaust manifolds for a normal engine and for a defective intake valve.

FIG. 11 shows the pressure waveforms in the exhaust manifolds of the engine 10, for another defect, namely an intake valve with excessive lash, say 0.020 inches. The waveform 174 comprises pressure pulses 176 and vacuum pulses 178 which are produced by the cold motoring engine with non-defective exhaust and intake valves for the right bank cylinders. Thus, the pressure pulses 176 are normal exhaust manifold pressure pulses and the vacuum pulses 178 are normal exhaust manifold vacuum pulses and will be used as reference values for test purposes. The waveform 172 represents the exhaust pressure pulses in the left bank manifold which has the defective intake value. This defect causes the vacuum pulse 178' to have a smaller amplitude whereas the other vacuum pulses and the pressure pulses are substantially unaffected. Thus, when the test vacuum pulse 178' has a pulse amplitude which is less than that of the normal vacuum pulse 178, it is taken as an indication of an excessive value of intake valve lash.

Figure 12:
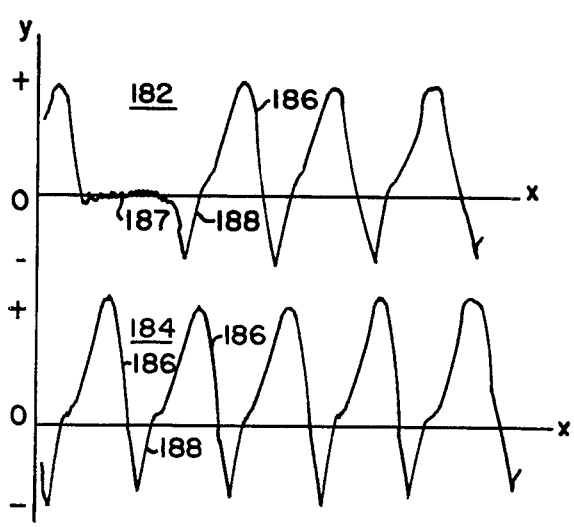
FIG. 12 shows the pressure waveforms of the exhaust manifolds for a normal engine and for a defective exhaust valve.

FIG. 12 shows the affect that a stuck-open exhaust valve has on the pressure waveform in the exhaust manifold. The waveform 184 comprises pressure pulses 186 and vacuum pulses 188 which are produced by the engine during cold motoring with non-defective exhaust and intake valves for the right bank cylinders. These are normal exhaust manifold vacuum pulses and will be used as reference values for test purposes. The waveform 182 represents the exhaust pressure pulses in the left bank manifold which has the defective exhaust valve. This valve defect causes an interval 187 of a substantially zero pressure instead of the normal vacuum pulse 188 and pressure pulse 186 whereas the other vacuum pulses and the pressure pulses are substantially unaffected. Thus, the defective condition of a stuck-open exhaust valve can be detected by comparing pulse amplitude or the pulse area of the test pressure pulse with the normal pressure pulse. When the value for the test pressure pulse is less than that for the normal pulse, it is taken as an indication of a stuck open exhaust valve.

Figure 13:
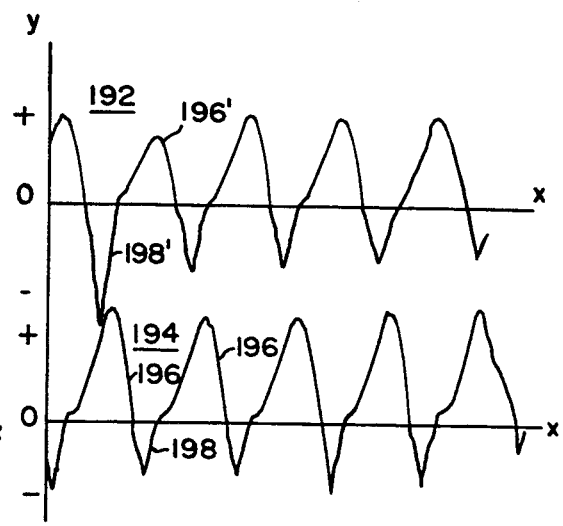
FIG. 13 shows the pressure waveforms in the exhaust manifolds for a normal engine and for a defective intake valve.

FIG. 13, shows the affect of a stuck-open intake valve on the pressure waveform in the exhaust manifold. The waveform 194 comprises pressure pulses 196 and vacuum pulses 198 for non-defective valve operation and represent normal pulses for use as reference values. The waveform 192 represents the exhaust pressure pulses in the left bank manifold which has the defective intake valve. The condition of the stuck-open intake valve results in an increase of the amplitude of a vacuum pulse 198' and a decrease of the amplitude of the succeeding pressure pulse 196'. In the test procedure, the test pressure pulse amplitude of each pulse is compared with the normal pulse amplitude and the test vacuum pulse amplitude is compared with the normal vacuum amplitude. If the test pulse vacuum amplitude is greater than normal and the following test pressure pulse amplitude is less than normal, it is taken as an indication of a stuck-open intake valve.

By means of a pressure transducer for sensing the pressure at the exhaust passage of an individual cylinder, the test is conducted to determine whether the camshaft is installed wrong. For this purpose, the pressure transducer 42 is connected with the exhaust passage of the #1 cylinder. For the engine 10, the pressure in this passage should be above a certain value at a given crankshaft angle. For example, in engine 10, the exhaust valve for #1 cylinder starts to open at one hundred fifteen degrees after top dead center. At this point, the pressure in the exhaust passage increases and produces a pressure pulse which is measured by the transducer 42. If the pressure pulse amplitude does not exceed a certain normal value, it is taken as an indication that the camshaft was not installed correctly.

Test Procedure Using Intake Pulse Analysis

Figure 14:
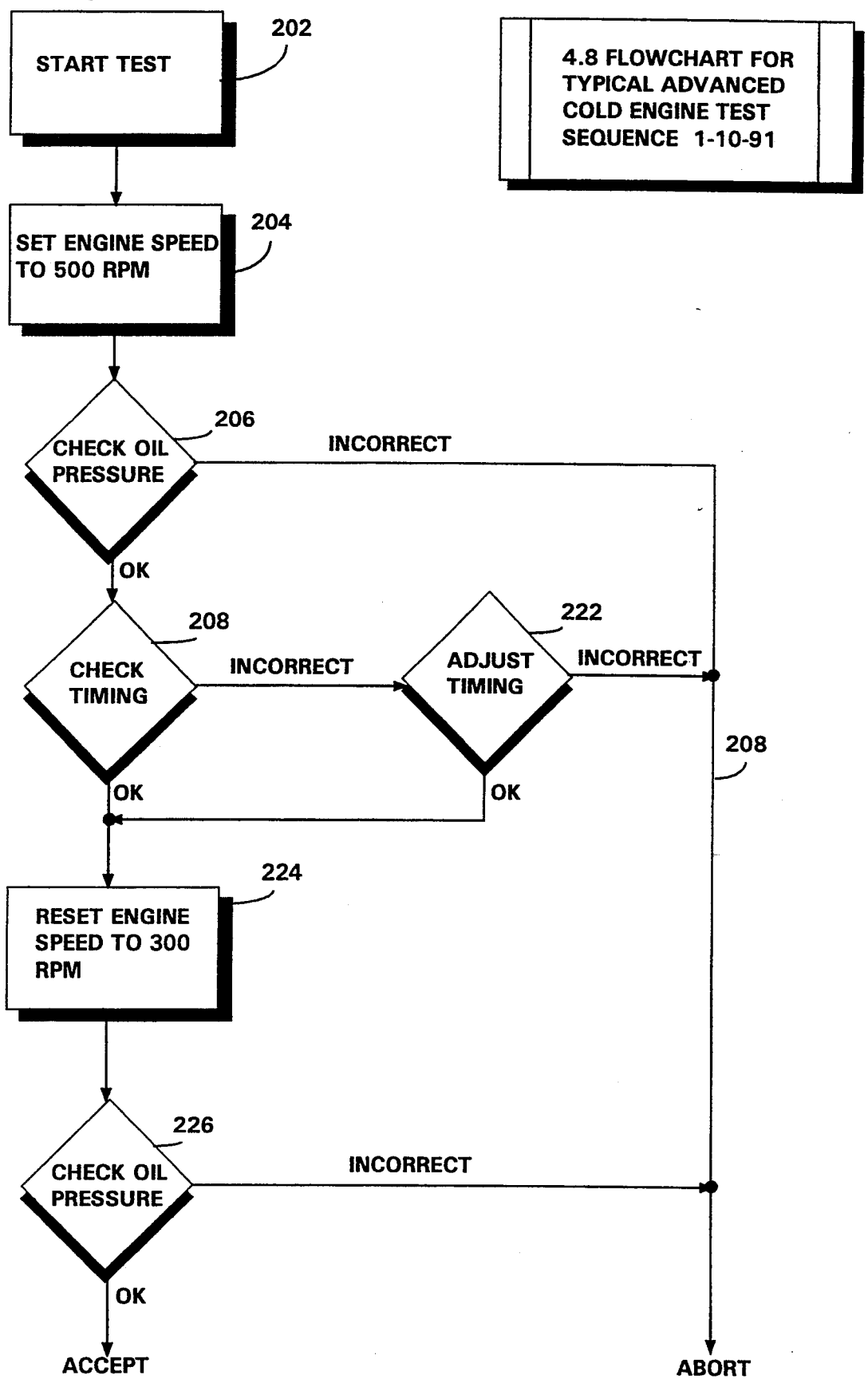
FIGS. 14 THROUGH 17 are program flow charts for the cold test procedure with intake pulse analysis.
Figure 15:
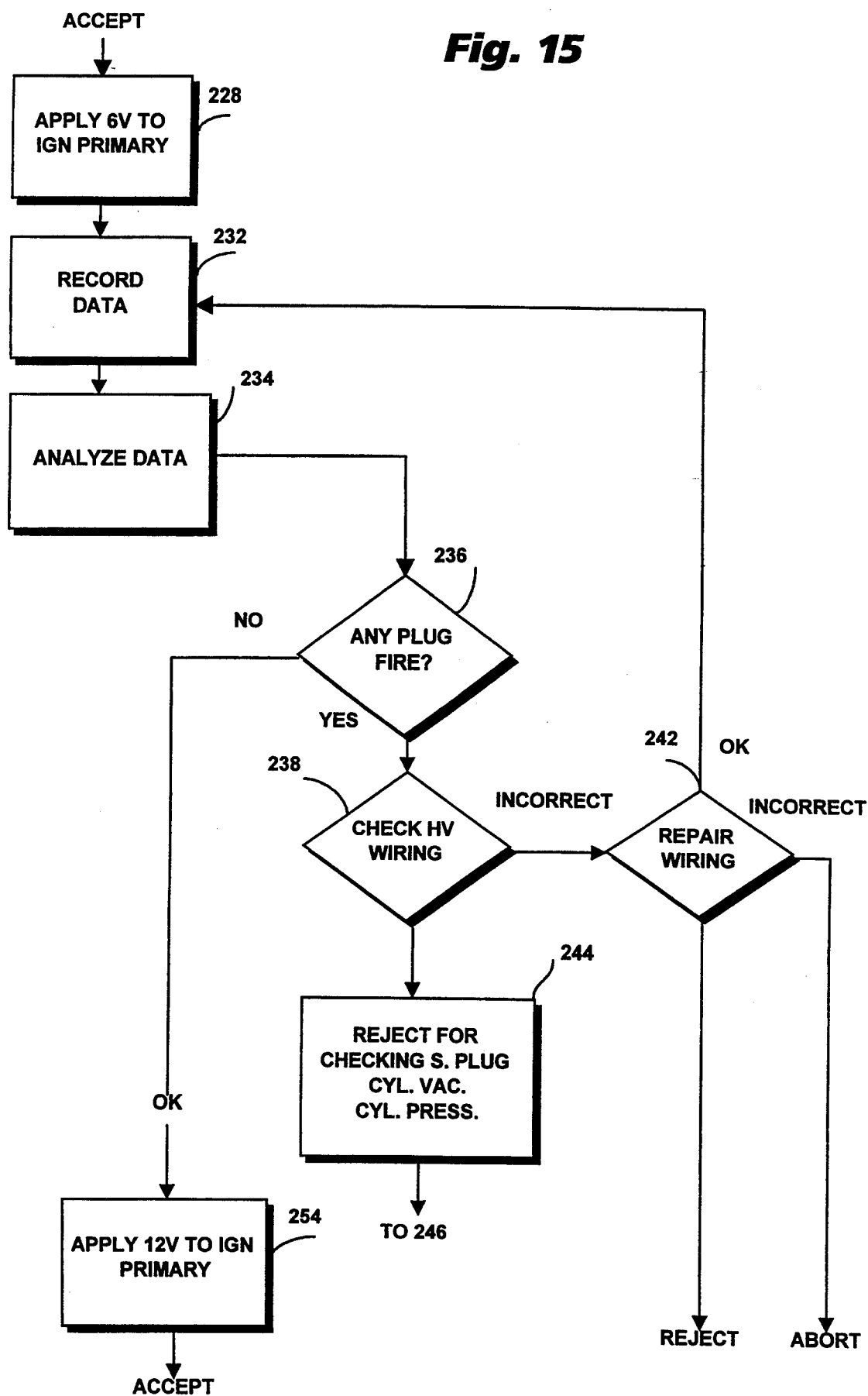
Figure 16:
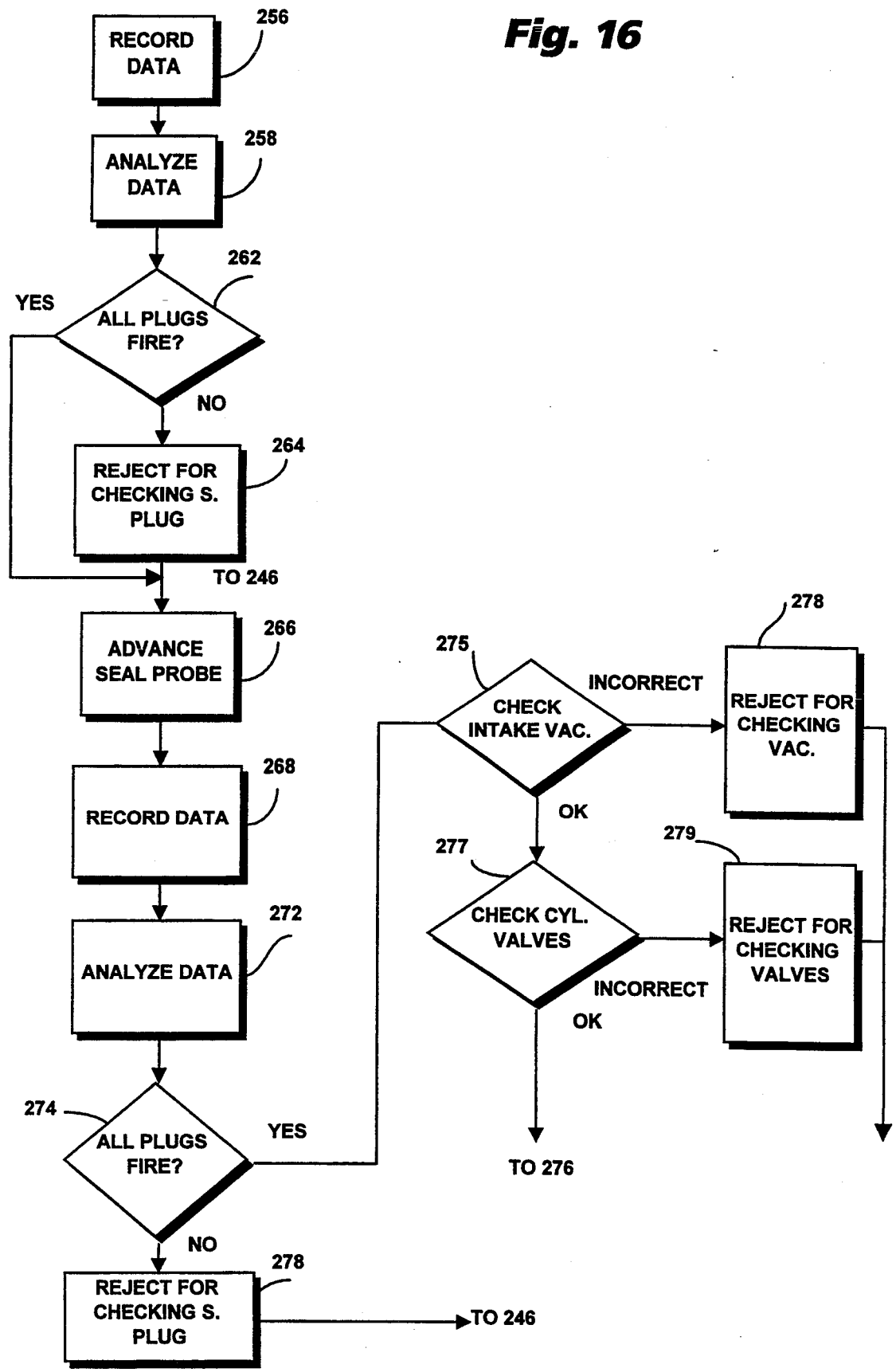

The test procedure using ignition and intake pulse analysis comprises a series of tests performed at the test stand of FIG. 1 and will be described with reference to the flow charts shown in FIG. 14 through 18. The test program, as previously stated, is conducted under computer control with certain overriding control by the operator at the test stand. Referring now to FIG. 14, the test is started as indicated at block 202 by the operator to initiate computer control. The computer under program control sets the engine speed to 500 RPM as indicated in block 204. This is accomplished through the drive controller 26 which controls the energization of the drive motor 14 to rotate the crankshaft of the engine 10 at 500 RPM in a cold motoring mode. When the proper speed is attained, the pressure transducer 46 is read under computer control to check the oil pressure against a normal pressure value as shown in block 206. If the oil pressure is not within an acceptable range, the test procedure is aborted and the procedure advances through the abort line 208 to the block 212 which aborts the engine test (see FIG. 17). In block 212, the program advances to the block 214 which turns off the drive motor 14. Next, the computer prints an engine test tag, as indicated at block 216, which states the reason for aborting the engine test, for example, "OIL PRESSURE" As shown in the final block 218, the computer monitor signifies that the test has ended and that the engine should be unclamped from the test stand and sent for inspection or repair with reference to the fault printed on the test tag.

Assuming that the test procedure at test block 206 (FIG. 14) indicates acceptable oil pressure, the program would advance to the test block 208 which checks the engine timing. If the timing is incorrect, the computer monitor will indicate that the timing should be adjusted and will wait for manual adjustment as indicated at test block 222. The timing is adjusted by manual adjustment of the distributor 18 (see FIG. 1). If the adjustment does not result in correct timing, the program advances to the block 212 which aborts the engine test in the abort procedure described above. If the timing is adjusted to a correct value, the program advances from block 222 to block 224 which resets the engine speed to 300 RPM. Then, the test block 226 checks the oil pressure for this new operating condition. If the oil pressure is incorrect, the engine test is aborted in the manner as previously described. If the oil pressure is satisfactory, the program advances to block 228 (see FIG. 15). Block 228 causes the programmable DC voltage source 64 to set the voltage at six volts. The test procedure is then entered wherein testing is done with less than normal voltage, referred to herein as "low voltage testing". Then, the data from the various sensors shown in FIG. 1 is recorded by the data acquisition system 48 into the memory 88 by the block 232. The ignition circuit data and intake and exhaust data is analyzed at block 234 in the manner described above. At test block 236, it is determined whether the data analysis indicates that any of the spark plugs fired. Spark plug firing with low voltage ignition indicates either an unacceptable low cylinder pressure, or an unacceptable short spark plug gap or both. Any of these conditions would result in spark plug firing at the reduced ignition supply voltage of six volts. Accordingly, the program advances to the test block 238 which prompts the operator to check the high voltage wiring especially to determine whether any spark plug lead wires are crossed. This condition might cause a spark event to occur in a cylinder at a time when it is under low compression. This manual check and repair is suitably performed at the test stand while the test procedure is at a halt. If the high voltage lead wires were incorrectly connected but could not be corrected by the operator, the engine test is aborted with the procedure advancing to block 212. If the high voltage wiring problem is corrected then the operator causes the program to loop back to block 232. This causes the data to be recorded again at block 232 and analyzed at block 234. The test at block 236 determines whether any plug fired. If one or more plugs fire, the program advances to the test block 238. With the high voltage wiring properly connected, the program advances to block 244 which rejects the engine based on spark plug firing. The engine must be manually checked for spark plug gap, cylinder vacuum and cylinder pressure. At this point, the program will advance to block 246 (FIG. 17) which indicates that the test engine is rejected. Then at block 214 the drive motor is turned off. At block 216 a test tag is printed with the statements "CHECK CYLINDER PRESSURE" "CHECK GAP" "CHECK CYLINDER VACUUM" for the noted cylinders. The test is ended at block 218.

After the manual checking and repair is performed, the test engine is put on the test stand again and the test procedure is repeated. If the test block 236 determines, on the first pass or a subsequent pass, that no spark plug fired the program proceeds directly to block 254. (It is noted that the manual checking could be performed with the engine on the test stand but data recording and analysis would be repeated after repair.)

As stated above, if in the test procedure thus far described, it is determined at block 236 that none of the spark plugs fired, the program proceeds directly to block 254 to that part of the test procedure wherein the normal rated voltage is applied to the ignition circuit, referred to herein as "high voltage testing". At block 254, the programmable voltage source 64 is set to twelve volts, the normal voltage for the engine ignition system. Then, the program proceeds to block 256 which causes data to be recorded for the high voltage test conditions. Then, at block 258 the data is analyzed as previously described. The program advances to test block 262 which determines whether all plugs fired. If not, the program advances to block 264 at which the engine is rejected for checking the spark plug for gap or other defects which would cause non-firing under normal ignition voltage. The procedure advances to block 246 which rejects the engine and thence to block 214 which turns off the drive motor. At block 216 the engine tag is printed with the statement "CHECK PLUGS". After manual checking and repair, the test engine is reinstalled on the test stand for another pass.

If at test block 262 it is determined that all plugs did fire, the program advances directly to block 266 which causes the intake seal probe to be actuated from its retracted position to its advanced position which seals the intake manifold. This simulates closed throttle operation and thus the compression in the cylinders is decreased. Then, the program advances to block 268 which again records the test data for the new conditions and thence it advances to block 272 at which the new data is analyzed. Next, at test block 274, it is determined whether all plugs fired. If one or more plugs did not fire, the program proceeds to block 278 which rejects the engine for manual checking of spark plugs. Then, the program advances through blocks 246, 214 and 216 which the engine test tag is printed with a statement "CHECK SPARK PLUGS". After repair, the engine is again placed on the test stand for another pass. If, at block 274, all plugs did fire the program goes to block 275. This block checks the intake manifold vacuum under computer control. This is done by comparing the computed average value with a normal value. If not Correct the program rejects the engine with the appropriate test tag. If the intake vacuum is correct, the program goes to block 277 which checks the cylinder valves. This is done under computer control by comparing the intake pulses with the normal pulse as described above. If a fault is detected, the program proceeds to reject the engine and tag it. If not, the program advances to block 276.

Block 276 checks the cam timing by determining whether the #1 cylinder exhaust pressure is at the prescribed pressure in the proper timing, as discussed above. If it is not, indicating that the camshaft was installed wrong, the program proceeds directly to block 246 which rejects the engine and a test tag is printed with the statement "CHECK CAM TIMING". If the test block 276 indicates that the cam timing is correct, the program proceeds to test block 278 which checks the oil pressure, if it is incorrect, the engine is rejected and the appropriate test tag is printed. If the test block 276 indicates that oil pressure is correct, then the test block 282 causes the monitor to prompt the operator to make a manual check of engine noise. If it is not satisfactory, the engine is rejected and the appropriate test tag is printed. If it is satisfactory, the program advances directly to block 214, 216 and 218 to end the test with a test tag which prints "ENGINE OKAY".

Test Procedure With Exhaust Pulse Analysis

The test procedure using exhaust pulse analysis instead of intake pulses will now be described. As discussed above, the data for this procedure is recorded on a test stand as depicted in FIG. 2.

Figure 17:
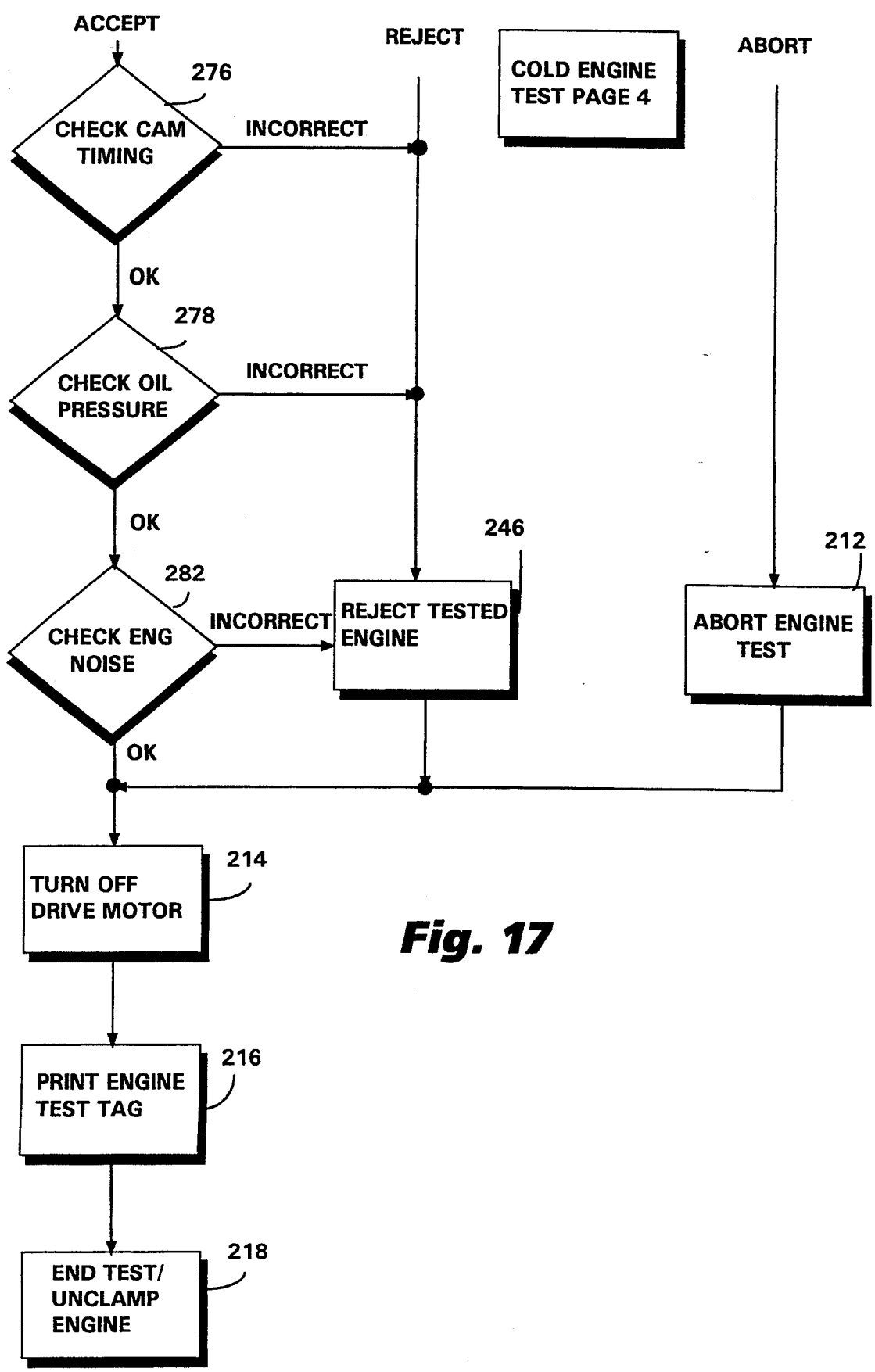
Figure 18:
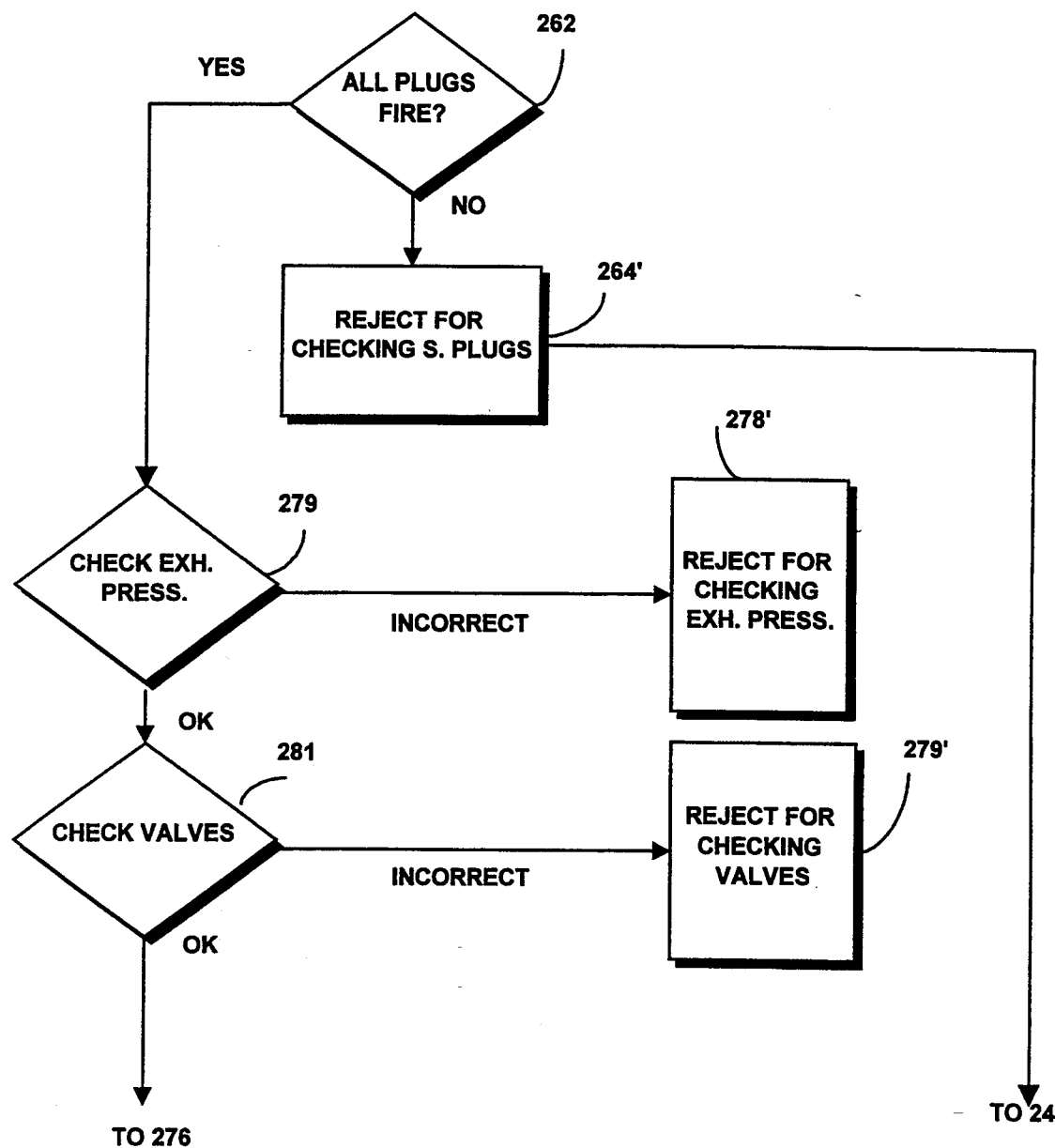
FIG. 18 is a program flow chart for the cold test procedure with exhaust pulse analysis.

In the test procedure with exhaust pulse analysis, the program is in many respects the same as that described above for the test procedure using vacuum pulse analysis. The program is the same from the "START TEST" block 202 in FIG. 14 through block 264 in FIG. 16. The program differs from this point until it reaches block 276 which checks cam timing as shown in FIG. 17. From this block 276 to the end of test the program is the same for exhaust pulse analysis as for vacuum pulse analysis. The program portion which is different for the exhaust pulse analysis is shown in FIG. 18. In this figure, the test block 262 determines whether all plugs fired. If not, the program advances to block 264' which rejects the engine for a manual check of the spark plugs. The program then proceeds to end the test with a test tag printed with the statement "CHECK PLUGS". If, at block 262, all plugs did fire, the program goes to block 279. This block checks the exhaust pressure under computer control. This is done by comparing the computed average value with a normal value. If not correct the program rejects the engine with the appropriate test tag. If the exhaust pressure is correct, the program goes to block 281 which checks the cylinder valves. This is done under computer control by comparing the exhaust pulses with the normal pulse as described above. If a fault is detected the program proceeds to reject the engine and tag it accordingly. If not, the program advances to block 276. The program is then completed from block 276 to the end of test as previously described.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A method of testing an internal combustion engine having an exhaust manifold, a plurality of cylinders and an operating cycle, said method comprising the steps of:

rotating said engine, without internal combustion, through said operating cycle at a speed sufficient to cause pressure variations in the exhaust related to each cylinder:

recording the pressure waveform defined as the pressure variations in the exhaust with respect to said engine operating cycle; and comparing the pressure waveform for each cylinder with a pressure waveform produced by a normal engine.

2. A method of testing an internal combustion engine according to claim 1, wherein said engine exhaust includes an exhaust manifold and said pressure variations are measured in said exhaust manifold.

3. A method of testing an internal combustion engine according to claim 1, wherein said step of rotating said engine comprises the step of rotating said engine in a normal engine operating direction.

4. A method of testing an internal combustion engine according to claim 1, wherein said pressure waveform comparison step includes the step of comparing a characteristic of the pressure waveform of each cylinder with a similar characteristic of a pressure waveform for a normal engine.

5. A method of testing an internal combustion engine according to claim 4, wherein said characteristic is amplitude of pressure.

6. A method of testing an internal combustion engine according to claim 5 wherein excessive exhaust valve lash is a condition to be determined, said pressure waveform includes at least one pressure pulse and at least one vacuum pulse, said characteristic is amplitude of said at least one vacuum pulse, and, in said comparing step, a vacuum pulse having an amplitude greater than the vacuum pulse of a normal engine is an indication of said excessive exhaust valve lash condition.

7. A method of testing an internal combustion engine according to claim 5 wherein excessive intake valve lash is a condition to be determined, said pressure waveform includes at least one pressure pulse and at least one vacuum pulse, said characteristic is amplitude of said at least one vacuum pulse, and, in said comparing step, a vacuum pulse having an amplitude less than the vacuum pulse of a normal engine is an indication of said excessive intake valve lash condition.

8. A method of testing an internal combustion engine according to claim 5 wherein a stuck open exhaust valve is a condition to be determined, said pressure waveform includes at least one pressure pulse and at least one vacuum pulse, said characteristic is amplitude of said at least one pressure pulse, and, in said comparing step, a pressure pulse having an amplitude less than the pressure pulse of a normal engine is an indication of said stuck open exhaust valve condition.

9. A method of testing an internal combustion engine according to claim 5 wherein a stuck open intake valve is a condition to be determined, said pressure waveform includes at least one pressure pulse and at least one vacuum pulse, said characteristic is amplitude of said at least one vacuum pulse and amplitude of a subsequent pressure pulse, and, in said comparing step, a vacuum pulse having an amplitude greater than the vacuum pulse of a normal engine followed by a pressure pulse having an amplitude less than the pressure pulse of a normal engine is an indication of said stuck open intake valve condition.

10. A method of testing an internal combustion engine according to claim 5 wherein improper camshaft installation is a condition to be determined, said pressure waveform includes one of at least one pressure pulse and at least one vacuum pulse, said characteristic is amplitude of said one of said at least one pressure pulse and said at least one vacuum pulse, and said comparing step includes the step of determining an angle of the engine operating cycle at which one of said at least one pressure pulse and said at least one vacuum pulse occurs and a determination that one of said at least one pressure pulse and said at least one vacuum pulse having an amplitude equal to a corresponding one of at least one pressure pulse and at least one vacuum pulse of a normal engine occurs at a different angle of said engine operating cycle is an indication of said improper camshaft installation condition.

11. A method of testing an internal combustion engine according to claim 4, wherein said characteristic is area under said pressure waveform.

12. A method of testing an internal combustion engine according to claim 11 wherein a stuck open exhaust valve is a condition to be determined, said pressure waveform includes at least one pressure pulse and at least one vacuum pulse, said characteristic is area under the pressure waveform of said at least one pressure pulse, and, in said comparing step, an area under said pressure waveform of said pressure pulse less than the area under the pressure waveform of a pressure pulse of a normal engine is an indication of said stuck open exhaust valve condition.

13. A method of testing an internal combustion engine having an exhaust, a plurality of cylinders and an operating cycle, said method comprising the steps of:

rotating said engine, without internal combustion, through said operating cycle at a speed sufficient to cause pressure variations in the exhaust related to each cylinder;

measuring pressure waveforms in the exhaust with respect to said engine operating cycle;

converting said pressure waveforms to digital data;

comparing characteristics of said digital data with characteristics of digital data for a normal engine; and indicating as abnormal any cylinder whose digital data comparison with a normal engine is beyond tolerance limits.

14. A method of testing an internal combustion engine according to claim 13, wherein said engine exhaust includes an exhaust manifold and said pressure variations are measured in said exhaust manifold.

15. A method of testing an internal combustion engine according to claim 13, wherein said step of rotating said engine comprises the step of rotating said engine in a normal engine operating direction.

16. A method of testing an internal combustion engine according to claim 13, wherein said characteristic is amplitude of pressure.

17. A method of testing an internal combustion engine according to claim 16 wherein excessive exhaust valve lash is a condition to be determined, said pressure waveform includes at least one pressure pulse and at least one vacuum pulse, said characteristic is amplitude of said at least one vacuum pulse, and, in said comparing step, a vacuum pulse having an amplitude greater than the vacuum pulse of a normal engine is an indication of said excessive exhaust valve lash condition.

18. A method of testing an internal combustion engine according to claim 16 wherein excessive intake valve lash is a condition to be determined, said pressure waveform includes at least one pressure pulse and at least one vacuum pulse, said characteristic is amplitude of said at least one vacuum pulse, and, in said comparing step, a vacuum pulse having an amplitude less than the vacuum pulse of a normal engine is an indication of said excessive intake valve lash condition.

19. A method of testing an internal combustion engine according to claim 16 wherein a stuck open exhaust valve is a condition to be determined, said pressure waveform includes at least one pressure pulse and at least one vacuum pulse, said characteristic is amplitude of said at least one pressure pulse, and, in said comparing step, a pressure pulse having an amplitude less than the pressure pulse of a normal engine is an indication of said stuck open exhaust valve condition.

20. A method of testing an internal combustion engine according to claim 16 wherein a stuck open intake valve is a condition to be determined, said pressure waveform includes at least one pressure pulse and at least one vacuum pulse, said characteristic is amplitude of said at least one vacuum pulse and amplitude of a subsequent pressure pulse, and, in said comparing step, a vacuum pulse having an amplitude greater than the vacuum pulse of a normal engine followed by a pressure pulse having an amplitude less than the pressure pulse of a normal engine is an indication of said stuck open intake valve condition.

21. A method of testing an internal combustion engine according to claim 16 wherein improper camshaft installation is a condition to be determined, said pressure waveform includes one of at least one pressure pulse and at least one vacuum pulse, said characteristic is amplitude of said one of said at least one pressure pulse and said at least one vacuum pulse, and said comprising step includes the step of determining an angle of the engine operating cycle at which one of said at least one pressure pulse and said at least one vacuum pulse occurs and a determination that one of said at least one pressure pulse and said at least one vacuum pulse having an amplitude equal to a corresponding one of at least one pressure pulse and at least one vacuum pulse of a normal engine occurs at a different angle of said engine operating cycle is an indication of said improper camshaft installation condition.

22. A method of testing an internal combustion engine according to claim 13, wherein said characteristic is area under said pressure waveform.

23. A method of testing an internal combustion engine according to claim 22 wherein a stuck open exhaust valve is a condition to be determined, said pressure waveform includes at least one pressure pulse and at least one vacuum pulse, said characteristic is area under the pressure waveform of said at least one pressure pulse, and, in said comparing step, an area under said pressure waveform of said pressure pulse less than the area under the pressure waveform of a pressure pulse of a normal engine is an indication of said stuck open exhaust valve condition.

24. An apparatus for testing an internal combustion engine having an exhaust, a plurality of cylinders and an operating cycle, said apparatus comprising:
means for rotating said engine, without internal combustion, through said operating cycle at a speed sufficient to cause pressure variations in the exhaust related to each cylinder;
means for recording the pressure waveform defined as the pressure variations in the exhaust with respect to said engine operating cycle; and means for comparing the pressure waveform for each cylinder with a pressure waveform produced by a normal engine.

25. An apparatus for testing an internal combustion engine according to claim 24, wherein said engine exhaust includes an exhaust manifold and said means for recording pressure variations is located in said exhaust manifold.

26. An apparatus for testing an internal combustion engine according to claim 24, wherein said means for rotating said engine comprises a means for rotating said engine in a normal engine operating direction.

27. An apparatus for testing an internal combustion engine according to claim 24, wherein said means for comparing pressure waveforms includes means for comparing a characteristic of the pressure waveform of each cylinder with a corresponding characteristic of a pressure waveform for a normal engine.

28. The apparatus according to claim 27, wherein said means for comparing a characteristic comprises a means for comparing amplitude of pressure.

29. The apparatus according to claim 28, wherein excessive exhaust valve lash is a condition to be determined, said pressure waveform includes at least one pressure pulse and at least one vacuum pulse, said means for comparing amplitude of pressure comprises means for comparing amplitude of said at least one vacuum pulse with the vacuum pulse of a normal engine and, where said at least one vacuum pulse has an amplitude greater than the vacuum pulse of a normal engine, for providing an indication of said excessive exhaust valve lash condition.

30. The apparatus according to claim 28, wherein excessive intake valve lash is a condition to be determined, said pressure waveform includes at least one pressure pulse and at least one vacuum pulse, said means for comparing amplitude of pressure comprises means for comparing amplitude of said at least one vacuum pulse with the vacuum pulse of a normal engine and, where said at least one vacuum pulse has an amplitude less than the vacuum pulse of a normal engine, for providing an indication of said excessive intake valve lash condition.

31. The apparatus according to claim 28, wherein a stuck open exhaust valve is a condition to be determined, said pressure waveform includes at least one pressure pulse and at least one vacuum pulse, said means for comparing amplitude of pressure comprises means for comparing amplitude of said at least one pressure pulse with the pressure pulse of a normal engine and, when said at least one pressure pulse has an amplitude less than the pressure pulse of a normal engine, for providing an indication of said stuck open exhaust valve condition.

32. The apparatus according to claim 28, wherein a stuck open intake valve is a condition to be determined, said pressure waveform includes at least one pressure pulse and at least one vacuum pulse, said means for comparing amplitude of pressure comprises means for comparing amplitude of said at least one vacuum pulse and a subsequent pressure pulse with corresponding vacuum and pressure pulses for a normal engine and, where said at least one vacuum pulse has an amplitude greater than the vacuum pulse of a normal engine and said subsequent pressure pulse has an amplitude less than the pressure pulse of a normal engine, for providing an indication of said stuck open intake valve condition.

33. The apparatus according to claim 28, wherein an improper camshaft installation is a condition to be determined, said pressure waveform includes at least one pressure pulse and at least one vacuum pulse, said means for comparing amplitude of pressure comprises means for measuring amplitude of one of said at least one pressure pulse and said at least one vacuum pulse and for determining an angle of the engine operating cycle at which said one of said at least one pressure pulse and said at least one vacuum pulse occurs, and, where said one of said at least one pressure pulse and said at least one vacuum pulse occurred at an angle of the engine operating cycle different from an angle of a normal engine operating cycle, for providing an indication of said improper camshaft installation condition.

34. The apparatus according to claim 27, wherein said means for comparing a characteristic comprises a means for comparing area under said pressure waveform.

35. The apparatus according to claim 34, wherein a stuck open exhaust valve is a condition to be determined, said pressure waveform includes at least one pressure pulse and at least one vacuum pulse, said means for comparing area under said pressure waveform comprises means for measuring area under a pressure pulse waveform and, where said pressure pulse waveform has an area less than area under a pressure pulse waveform of a normal engine, for providing an indication of said stuck open exhaust valve condition.

36. An apparatus for testing an internal combustion engine having an exhaust, a plurality of cylinders and an operating cycle, said apparatus comprising:
   means for rotating said engine, without internal combustion, through said operating cycle at a speed sufficient to cause pressure variations in the exhaust related to each cylinder;
   means for measuring pressure waveforms in the exhaust at a speed of rotation which produces pressure variations related to respective cylinders;
   means, responsive to said measuring means, for converting said pressure waveforms to digital data;
   means, responsive to said converting means, for comparing characteristics of said digital data with characteristics of digital data for a cylinder produced by a normal engine; and
   means, responsive to said comparing means, for indicating as abnormal any cylinder whose digital data comparison with a normal engine is beyond preset tolerance limits.

37. An apparatus for testing an internal combustion engine according to claim 36, wherein said engine exhaust includes an exhaust manifold and said means for recording pressure variations is located in said exhaust manifold.

38. An apparatus for testing an internal combustion engine according to claim 36, wherein said means for rotating said engine comprises a means for rotating said engine in a normal engine operating direction.

39. The apparatus according to claim 36, wherein said means for measuring pressure waveforms comprises an analog pressure sensor and said means for converting comprises an analog-to-digital converter, responsive to said pressure sensor, for providing digital pressure data to said means for comparing.

40. The apparatus according to claim 39, wherein said means for comparing digital data characteristics comprises a means for comparing digital data representative of amplitude of pressure.

41. The apparatus according to claim 40, wherein excessive exhaust valve lash is a condition to be determined, said pressure waveform includes at least one pressure pulse and at least one vacuum pulse, said means for comparing digital data representative of amplitude of pressure comprises means for comparing amplitude of said at least one vacuum pulse with the vacuum pulse of a normal engine and, where said at least one vacuum pulse has an amplitude greater than the vacuum pulse of a normal engine, for providing an indication of said excessive exhaust valve lash condition.

42. The apparatus according to claim 40, wherein excessive intake valve lash is a condition to be determined, said pressure waveform includes at least one pressure pulse and at least one vacuum pulse, said means for comparing digital data representative of amplitude of pressure comprises means for comparing amplitude of said at least one vacuum pulse with the vacuum pulse of a normal engine and, where said at least one vacuum pulse has an amplitude less than the vacuum pulse of a normal engine, for providing an indication of said excessive intake valve lash condition.

43. The apparatus according to claim 40, wherein a stuck open exhaust valve is a condition to be determined, said pressure waveform includes at least one pressure pulse and at least one vacuum pulse, said means for comparing digital data representative of amplitude of pressure comprises means for comparing amplitude of said at least one pressure pulse with the pressure pulse of a normal engine and, where said at least one pressure pulse has an amplitude less than the pressure pulse of a normal engine, for providing an indication of said stuck open exhaust valve condition.

44. The apparatus according to claim 40, wherein a stuck open intake valve is a condition to be determined, said pressure waveform includes at least one pressure pulse and at least one vacuum pulse, said means for comparing digital data representative of amplitude of pressure comprises means for comparing amplitude of said at least one vacuum pulse and a subsequent pressure pulse with corresponding vacuum and pressure pulses for a normal engine and, where said at least one vacuum pulse has an amplitude greater than the vacuum pulse of a normal engine and said subsequent pressure pulse has an amplitude less than the pressure pulse of a normal engine, for providing an indication of said stuck open intake valve condition.

45. The apparatus according to claim 40, wherein an improper camshaft installation is a condition to be determined, said pressure waveform includes at least one pressure pulse and at least one vacuum pulse, said means for comparing digital data representative amplitude of pressure comprises means for measuring amplitude of one of said at least one pressure pulse and said at least one vacuum pulse and for determining an angle of the engine operating cycle at which said one of said at least one pressure pulse and said at least one vacuum pulse occurs, and, where said one of said at least one pressure pulse and said at least one vacuum pulse occurs at an angle of the engine operating cycle different from an angle of a normal engine operating cycle, for providing an indication of said improper camshaft installation condition.

46. The apparatus according to claim 39, wherein said means for comparing digital data characteristics comprises a means for comparing area under said pressure waveform.

47. The apparatus according to claim 46, wherein a stuck open exhaust valve is a condition to be determined, said pressure waveform includes at least one pressure pulse and at least one vacuum pulse, said means for comparing area under said pressure waveform comprises means for measuring area under a pressure pulse waveform and, where said pressure pulse waveform has an area less than an area under a pressure pulse waveform of a normal engine, for providing an indication of said stuck open exhaust valve condition.

* * * * *